US006626542B2

(12) United States Patent
Baba et al.

(10) Patent No.: US 6,626,542 B2
(45) Date of Patent: Sep. 30, 2003

(54) REFLECTION TYPE PROJECTION OPTICAL SYSTEM

(75) Inventors: Tomoyuki Baba, Saitama (JP); Chikara Yamamoto, Saitama (JP)

(73) Assignee: Fuji Photo Optical Co., Ltd., Saitama (JP)

(*) Notice: Subject to any disclaimer, the term of this patent is extended or adjusted under 35 U.S.C. 154(b) by 0 days.

(21) Appl. No.: 10/084,973

(22) Filed: Mar. 1, 2002

(65) Prior Publication Data

US 2002/0191161 A1 Dec. 19, 2002

(30) Foreign Application Priority Data

Mar. 29, 2001 (JP) ........................................ 2001-095319

(51) Int. Cl.[7] ............................. G03B 21/28; G02B 5/10
(52) U.S. Cl. ........................ 353/98; 353/99; 359/859; 359/861
(58) Field of Search ................................ 359/838, 858, 359/859, 860, 861, 862, 843, 864; 353/98, 122

(56) References Cited

U.S. PATENT DOCUMENTS

| | | | | |
|---|---|---|---|---|
| 4,265,510 A | * | 5/1981 | Cook | .......................... 359/366 |
| 5,871,266 A | * | 2/1999 | Negishi et al. | ................ 353/98 |
| 6,016,220 A | * | 1/2000 | Cook | .......................... 359/351 |

FOREIGN PATENT DOCUMENTS

| | | |
|---|---|---|
| JP | 10-111458 | 4/1998 |
| JP | 2000-66105 | 3/2000 |

* cited by examiner

*Primary Examiner*—Russell Adams
*Assistant Examiner*—Andrew Sever
(74) *Attorney, Agent, or Firm*—Snider & Associates; Ronald R. Snider

(57) ABSTRACT

A bright reflection type projection optical system is used for projecting onto a screen under magnification a luminous flux carrying image information from a light valve driven by an image signal, while favorably correcting aberration. The reflection type projection optical system comprises, successively from the enlargement side, a first mirror having a positive power, a second mirror having a negative power, and a third mirror having a positive power.

7 Claims, 12 Drawing Sheets

EXAMPLE 1

EXAMPLE 1

EXAMPLE 2

EXAMPLE 3

EXAMPLE 4

EXAMPLE 5

EXAMPLE WITH
LARGE DISTORTION

EXAMPLE WITH
DISTORTION CORRECTED

EXAMPLE 1

EXAMPLE 4

EXAMPLE 2

EXAMPLE 5

EXAMPLE 3

EXAMPLE 1
LATERAL ABERRATION

EXAMPLE 2
LATERAL ABERRATION

EXAMPLE 4
LATERAL ABERRATION

EXAMPLE 5
LATERAL ABERRATION

REFLECTION TYPE PROJECTION OPTICAL SYSTEM

RELATED APPLICATIONS

This application claims the priority of Japanese Patent Application No. 2001-95319 filed on Mar. 29, 2001, which is incorporated herein by reference.

BACKGROUND OF THE INVENTION

1. Field of the Invention

The present invention relates to a reflection type projection optical system used as a projection optical system in projection display apparatus, projection type TV sets, and the like; and, in particular, to a reflection type projection optical system using a reflecting mirror as an element of the projection optical system.

2. Description of the Prior Art

In projection lenses of projection type display apparatus and projection type TV sets, those of refraction optical systems using optical glass and those combining refraction optical systems and mirrors have widely been known. Most of the projection lenses currently in use are of this type.

When a refraction optical system is used, however, chromatic aberration inevitably occurs due to characteristics of optical glass. In particular, occurrences of axial chromatic aberration and chromatic aberration in magnification may become large problems in a telephoto type having a long focus and a wide-angle type having a short focus, respectively.

When an aspheric optical surface is introduced in order to ameliorate optical performances, many problems may occur due to the fact that optical glass is formed into an aspheric surface. When a large aspheric surface is to be made, in particular, manufacturing problems in terms of cost, weight, and surface accuracy may occur, whereby it will be hard to employ in a product even if it is possible in terms of design. Hence, a projection optical system has been known Japanese Unexamined Patent Publication No. 2000-66105), which is basically constituted by lenses (refraction optical system) whereas large aspheric mirrors are employed in parts necessitating large aspheric surfaces. Though it alleviates problems in terms of cost, weight, and the like when compared with the case where large optical lenses having aspheric surfaces are mounted, the problem of chromatic aberration may be left unsolved.

For eliminating the chromatic aberration generated when using lenses, a projection optical system constituted by three mirrors alone has been known Japanese Unexamined Patent Publication No. 10-111458). The projection optical system using the mirrors alone comprises, successively from the enlargement side, a mirror having a negative power, a mirror having a negative power, and a mirror having a positive power.

The projection optical system using the mirrors alone disclosed in the above-mentioned publication, however, may not be a bright optical system. For making it function as a projection optical system in practice, a very bright illumination optical system may be needed, which increases the size and cost of the illumination optical system.

SUMMARY OF THE INVENTION

In view of the foregoing circumstances, it is an object of the present invention to provide a bright reflection type projection optical system while favorably correcting various kinds of aberration such as distortion and chromatic aberration in particular.

The present invention provides a reflection type projection optical system for projecting onto a screen under magnification a luminous flux carrying image information from a light valve driven by an image signal; the reflection type projection optical system comprising successively from the enlargement side:

a first mirror having a positive power;

a second mirror having a negative power; and a third mirror having a positive power.

Preferably, the reflection type projection optical system satisfies the following conditional expression (1):

$$-1.0 < f_3/f_{12} < -0.2 \tag{1}$$

where $f_{12}$ is the composite focal length of the first and second mirrors, and $f_3$ is the focal length of the third mirror.

Preferably, at least one of the three mirrors is constituted by a free-form surface having a form rotationally asymmetrical about an optical axis thereof.

The first mirror may be constituted by a free-form surface having a form rotationally asymmetrical about the optical axis.

Each of the three mirrors may be constituted by a free-form surface having a form rotationally asymmetrical about the optical axis.

All of the three mirrors may have respective optical axes within a single plane.

The three mirrors may have the same optical axis.

The light valve may be one selected from a transmission type liquid crystal device, a reflection type liquid crystal device, and a digital micromirror device.

As mentioned above, the reflection type projection optical system in accordance with the present invention comprises, successively from the enlargement side, a first mirror having a positive power, a second mirror having a negative power, and a third mirror having a positive power.

This yields a favorable balance in terms of aberration correction, thereby ameliorating aberration correction. When negative, negative, and positive mirrors are successively arranged from the enlargement side as in the above-mentioned prior art, the heaviest load is applied to the last mirror (closest to the display device) having a positive power in terms of power distribution, whereby a bright optical system is hard to obtain. When positive, negative, and positive mirrors are successively arranged as in the present invention, by contrast, a positive power can be split into the front and rear sides of the optical system, which is advantageous in terms of aberration correction, whereby a bright optical system can be obtained.

DESCRIPTION OF THE PREFERRED EMBODIMENTS

In the following, an embodiment of the present invention will be explained with reference to the drawings.

Figure 1:
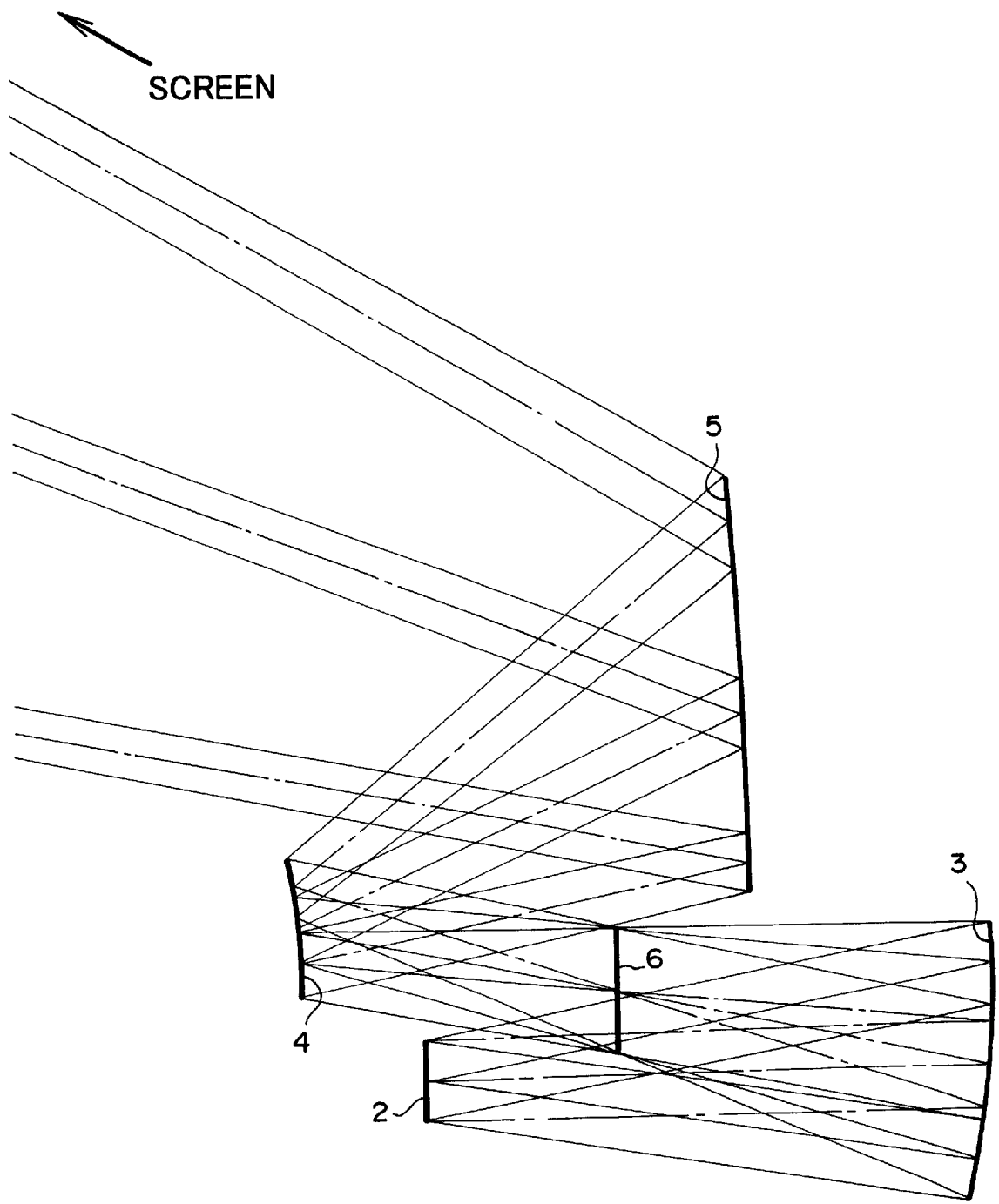
FIG. 1 is a sectional view showing the reflection type projection optical system in accordance with Example 1 of the present invention.

FIG. 1 shows the configuration of the reflection type projection optical system in accordance with Example 1 as a typical example of this embodiment of the present invention. The following numerical data are those obtained when the focal length of the whole system is standardized at 1.

As shown in FIG. 1, the reflection type projection optical system in accordance with this embodiment of the present invention is an optical system for projecting onto a screen (not depicted) under magnification a luminous flux carrying image information from a light valve 2 driven by an image signal; and comprises, successively from the enlargement side, a (concave) first mirror 5 having a positive power, a (convex) second mirror 4 having a negative power, and a (concave) third mirror 3 having a positive power. A stop 6 is disposed between the second mirror 4 and the first mirror 3 (though an actual stop is not always necessary).

This reflection type projection optical system satisfies the following conditional expression (1):

$$-1.0 < f_3/f_{12} < -0.2 \tag{1}$$

where $f_{12}$ is the composite focal length of the first and second mirrors 5, 4, and $f_3$ is the focal length of the third mirror 3.

This conditional expression (1) defines a condition which makes it easier to arrange mirrors while favorably correcting aberration. If the lower limit of the range is not satisfied, the focal length of the third mirror 3 will be too long, whereby aberration will be hard to correct. If the upper limit is exceeded, by contrast, the focal length of the third mirror 3 will be too short, whereby the distance between the imaging position on the reduction side and the third mirror 3 will decrease, which makes it difficult to arrange the mirrors such that they do not interfere with the luminous flux.

In the reflection type projection optical system in accordance with this embodiment, at least one of the three mirrors 3, 4, 5 is constituted by a free-form surface having a form rotationally asymmetrical about the optical axis.

Figure 6A:
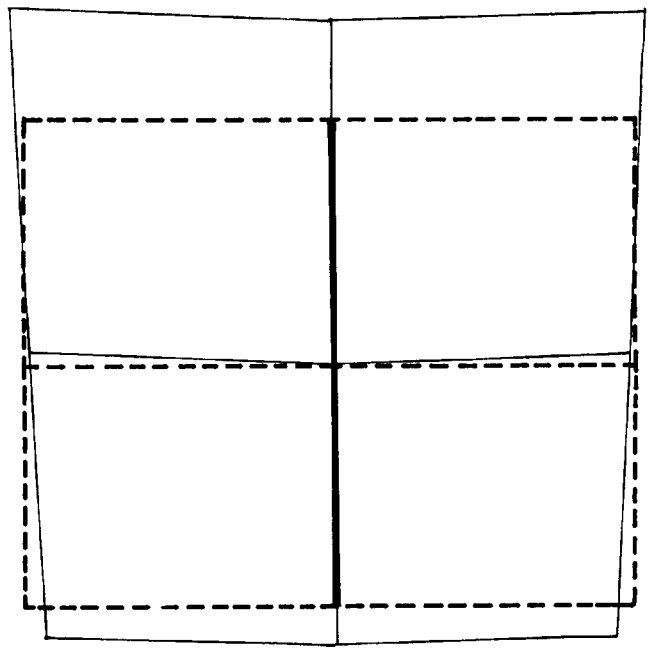
FIGS. 6A and 6B are schematic views for explaining a distortion correcting effect in the reflection type projection optical system in accordance with an embodiment of the present invention.

When the interference between mirrors and the eclipse of luminous fluxes caused by mirrors are taken into consideration, it is necessary for the mirrors to be constructed similar to very wide lenses in a lens system or have a large amount of eccentricity, for example, whereby the deterioration of distortion (see the solid line part of FIG. 6A in which an image form without distortion is indicated with broken lines) may become problematic in particular.

Figure 6B:
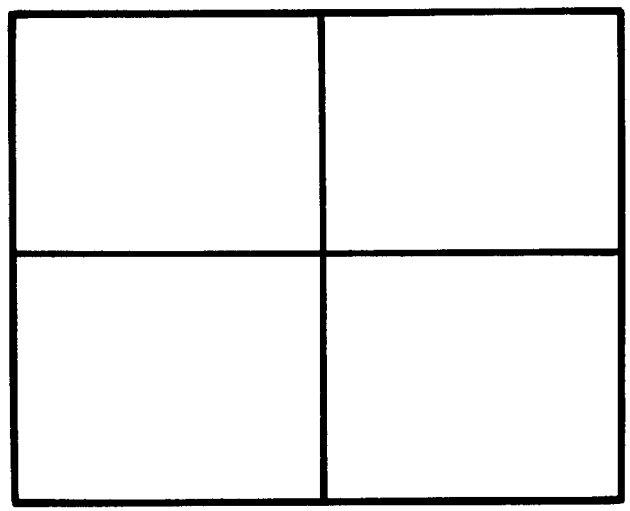

Therefore, in the reflection type projection optical system in accordance with this embodiment, at least one mirror surface is constituted by a free-form surface having a form asymmetrical about the optical axis, whereby aberration correction can be made favorable (see FIG. 6B).

When making a single mirror with a free-form surface having a form rotationally asymmetrical about the optical axis, it will be the most efficient if the first mirror 5 has the free-form surface. Since a free-form surface has an asymmetric form, it becomes difficult to measure the mirror surface form actually made in the manufacturing process and arrange the mirror when assembling the optical system. Therefore, it will be advantageous in terms of production if the number of mirrors having free-form surfaces is small. Hence, it is desirable that only the first mirror 5, which is the most effective in correcting distortion, be provided with a free-form surface, whereby aberration can be corrected favorably while improving the cost performance.

When each of the three mirrors 3, 4, 5 is constituted by a free-form surface having a form rotationally asymmetrical about the optical axis, the best optical performances can be attained as a matter of course.

When the three mirrors 3, 4, 5 are not constituted by coaxial systems but by eccentric systems, the interference between mirrors and the eclipse of luminous fluxes caused by mirrors can be reduced without making a paraxially wide-angle optical system.

On the other hand, constructing the mirrors 3, 4, 5 with their respective optical axes positioned within the same plane is advantageous in terms of cost and productivity since the mirror forms have symmetry at least within a predetermined plane. These advantages further increase when the respective optical axes of all the mirrors 3, 4, 5 are made coaxial.

EXAMPLES

Examples 1 to 5 will now be explained with reference to specific numerical values.

Example 1

The reflection type projection optical system in accordance with Example 1 of the present invention is configured as mentioned above and shown in FIG. 1. In the optical system of Example 1, each of the three mirror surfaces has an aspheric form which differs from so-called free-form surface but is represented by the following free-form surface expression (including an aspheric surface expression):

$$z = \frac{\rho^2/r}{1 + \sqrt{1 - K(\rho/r)^2}} + \sum A_{2i}\rho^{2i} + \sum\sum C_{ij}x^i y^j \quad (\rho^2 = x^2 + y^2)$$

where z is the distance from the lens surface along the optical axis Z;

$\rho$ is the distance on the XY plane provided perpendicular to the optical axis Z;

K is the eccentricity;

r is the radius of curvature;

$A_{2i}$ is the aspheric surface coefficient; and $C_{ij}$ is the free-form surface coefficient.

Further, each mirror surface has an amount of eccentricity with respect to the optical axis due to a deviation in Y-axis direction.

The upper part of the following Table 1 shows the radius of curvature R of each of optical surfaces (screen, mirror, stop, and image display device surfaces) and air space D between each pair of optical surfaces. The middle part of Table 1 shows only the aspheric surface coefficients in the above-mentioned free-form surface expression, whereas the lower part of Table 1 shows the amount of eccentricity of each mirror surface.

In each of Table 1 and its subsequent Tables 2 to 5 explained later, numbers referring to each parameter successively increase from the enlargement side.

The value corresponding to conditional expression (1) in the optical system of Example 1 is −0.98, whereby this conditional expression is satisfied.

Figure 7A:
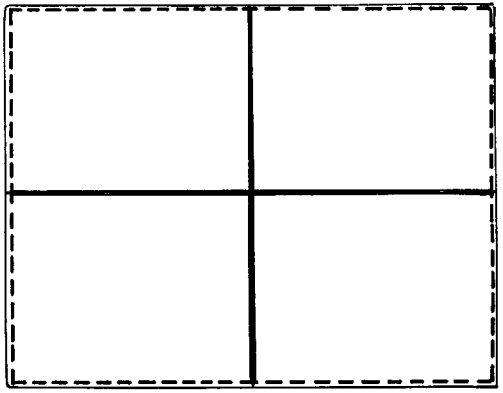
FIGS. 7A to 7E are schematic views showing respective distortion correcting effects in the examples.

FIG. 7A shows the distortion concerning Example 1 (with the solid line part, whereas broken lines indicate an image form obtained without distortion; ditto in FIGS. 7B to 7E).

Figure 8:
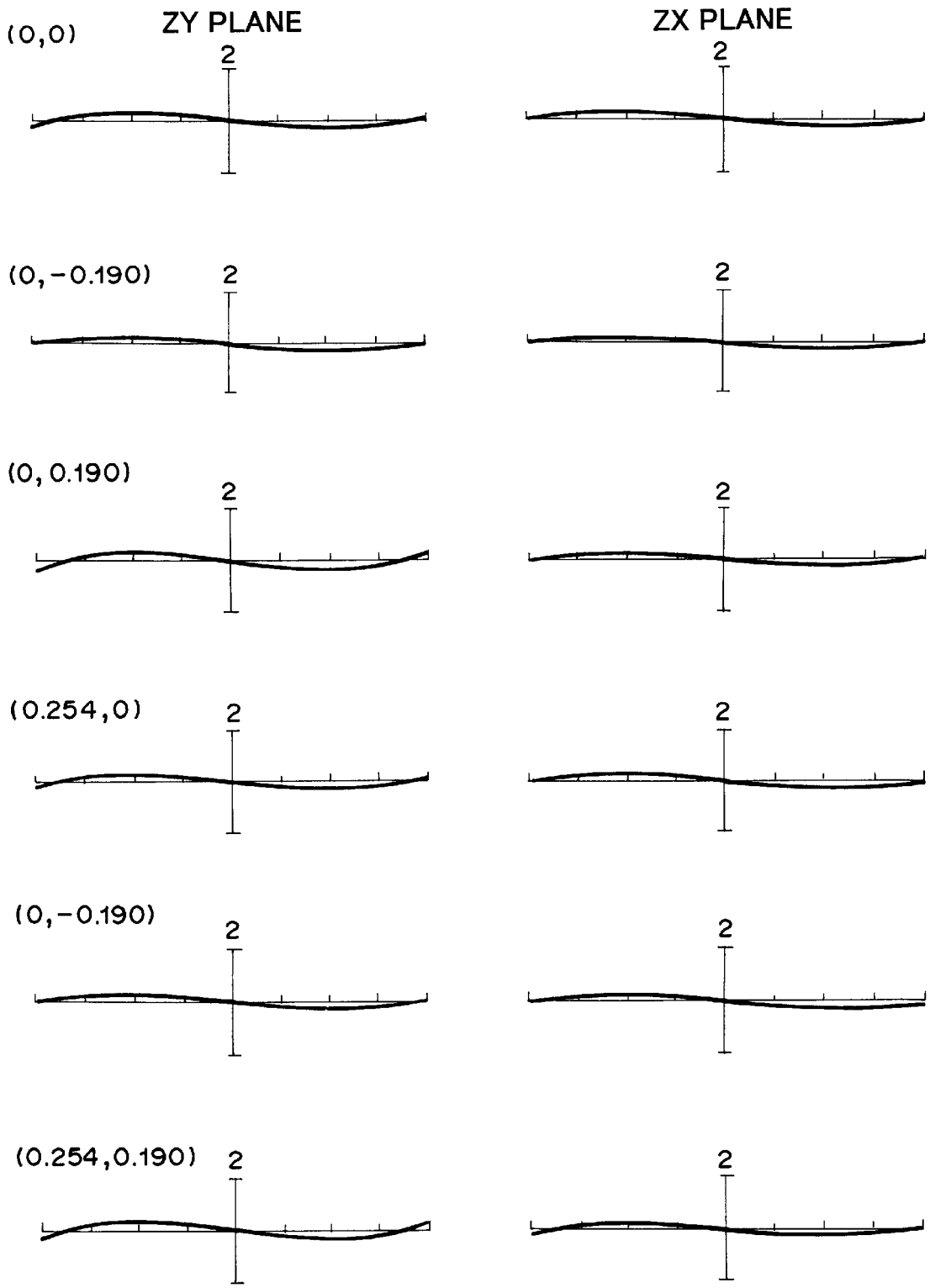
FIG. 8 is aberration chart showing lateral aberration of the reflection type projection optical system in accordance with Example 1 of the present invention.

FIG. 8 shows the lateral aberration concerning Example 1 (with each abscissa indicating positions on XY plane, whereas each ordinate indicating the amount of aberration, in the case where the total focal length is standardized at 1). The charts on the left side of FIG. 8 shows the lateral aberration on ZY plane and the charts on the right side of FIG. 8 shows the lateral aberration on ZX plane. The coordinates on the left side of each of charts indicate a coordinate position on XY plane on the reduction side (ditto in FIGS. 9 to 12 in the following).

Each of these aberration charts clearly shows that the lateral aberration in the reflection type projection optical system in accordance with Example 1 is made favorable.

Example 2

Figure 2:
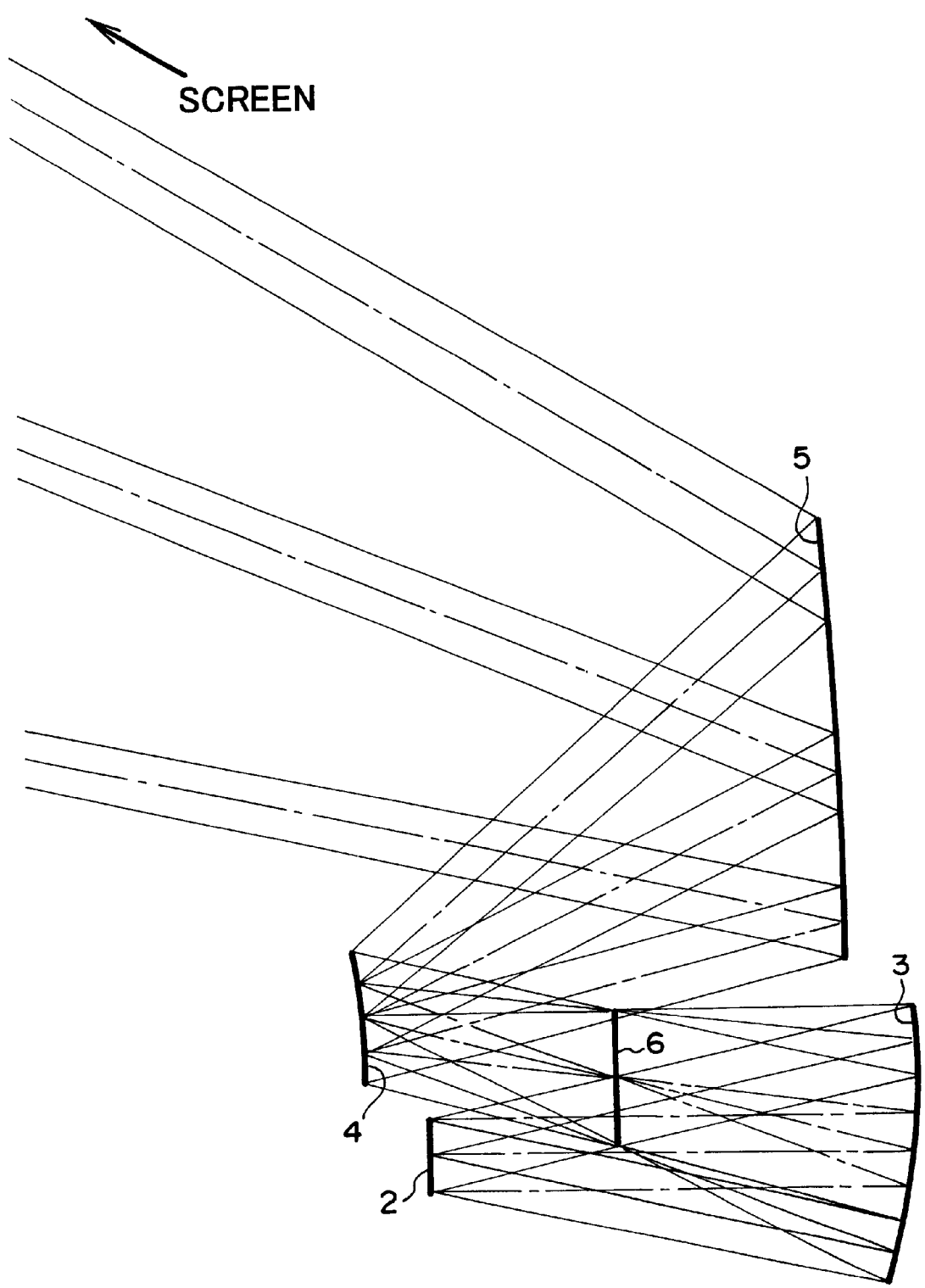
FIG. 2 is a sectional view showing the reflection type projection optical system in accordance with Example 2 of the present invention.

The reflection type projection optical system in accordance with Example 2 of the present invention will now be explained with reference to FIG. 2. In the optical system of Example 2, only the mirror surface of the first mirror 5 is a free-form surface (including an aspheric surface) represented by the above-mentioned free-form surface expression (including an aspheric surface expression), whereas each of the mirror surfaces of the second mirror 4 and third mirror 3 is an aspheric surface. Further, each mirror surface has an amount of eccentricity with respect to the optical axis due to a deviation in Y-axis direction.

The upper part of the following Table 2 shows the radius of curvature R of each of optical surfaces (screen, mirror, stop, and image display device surfaces) and air space D between each pair of optical surfaces in the reflection type projection optical system in accordance with Example 2. The middle part of Table 2 shows the free-form surface coefficients (including the aspheric surface coefficients) in the above-mentioned free-form surface expression, whereas the lower part of Table 2 shows the amount of eccentricity of each mirror surface.

The value corresponding to conditional expression (1) in the optical system of Example 2 is −0.98, whereby this conditional expression is satisfied.

Figure 7D:
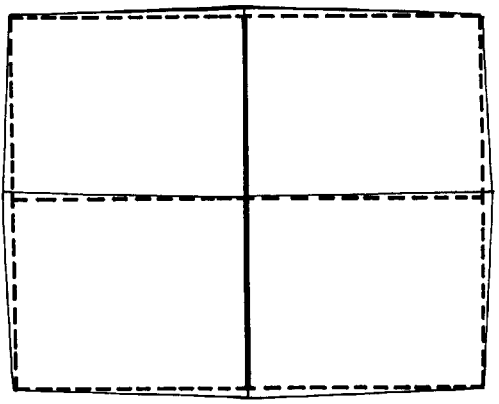
Figure 7B:
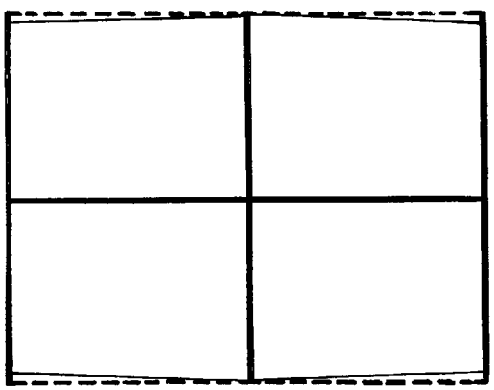

FIG. 7B shows the distortion concerning Example 2.

Figure 9:
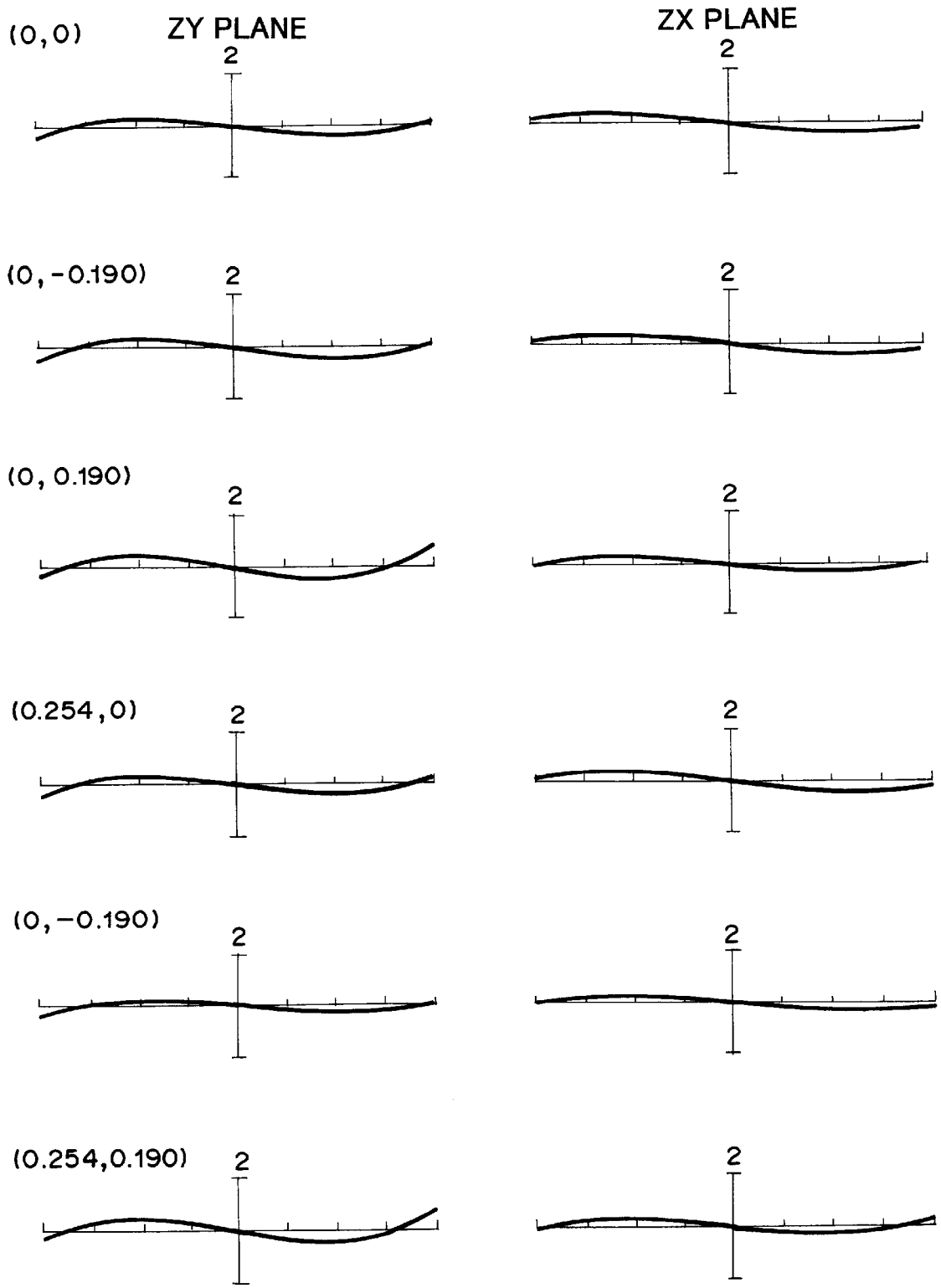
FIG. 9 is aberration chart showing lateral aberration of the reflection type projection optical system in accordance with Example 2 of the present invention.

FIG. 9 shows the lateral aberration concerning Example 2 (with each abscissa indicating positions on XY plane, whereas each ordinate indicating the amount of aberration, in the case where the total focal length is standardized at 1; ditto in the similar charts in the following).

Each of these aberration charts clearly shows that the lateral aberration in the reflection type projection optical system in accordance with Example 2 is key made favorable.

Example 3

Figure 3:
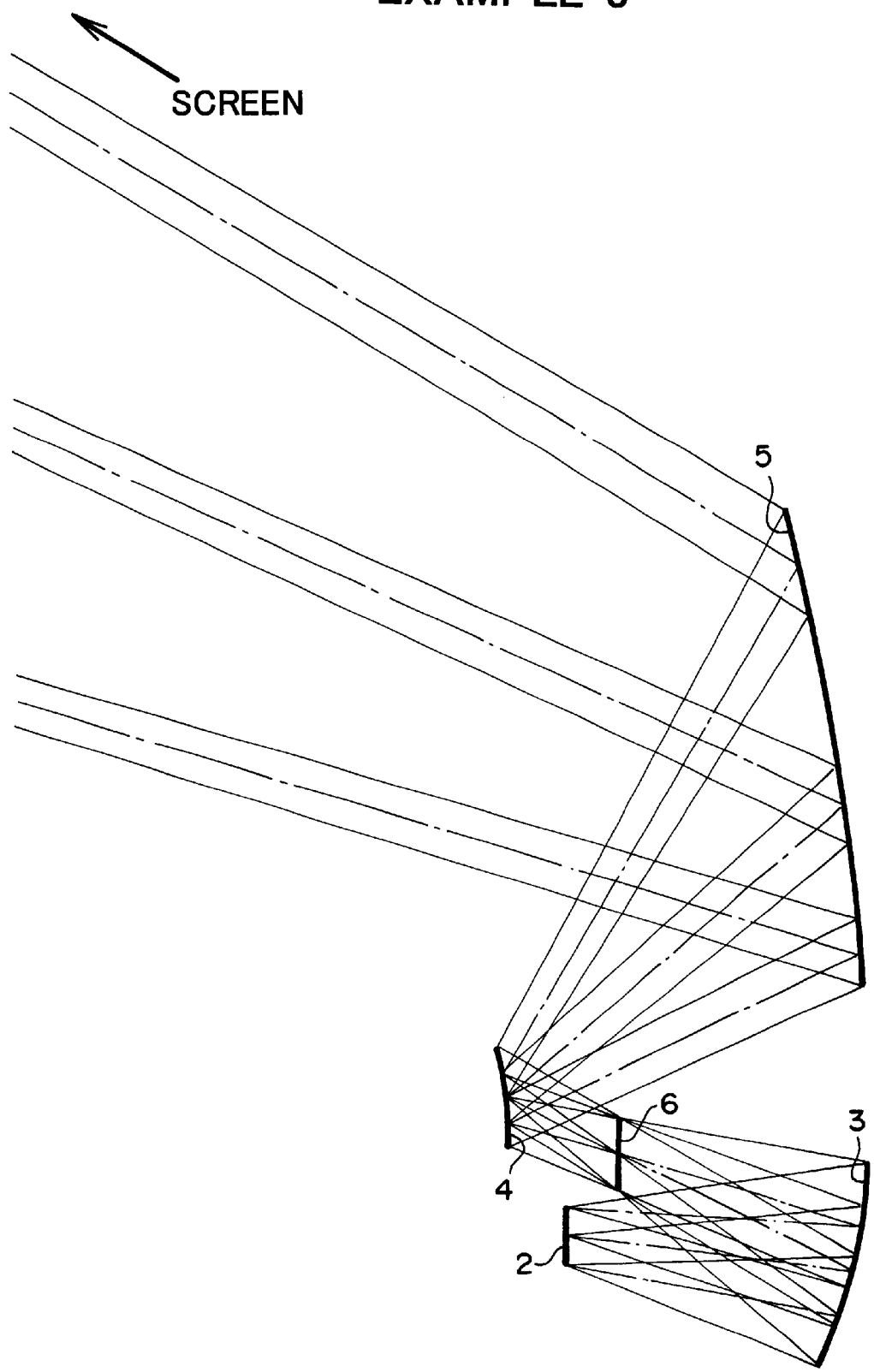
FIG. 3 is a sectional view showing the reflection type projection optical system in accordance with Example 3 of the present invention.

The reflection type projection optical system in accordance with Example 3 of the present invention will now be explained with reference to FIG. 3. In the optical system of Example 3, each of the mirror surfaces is a free-form surface (including an aspheric surface) represented by the above-mentioned free-form surface expression (including an aspheric surface expression) and has an amount of eccentricity with respect to the optical axis due to a deviation in Y-axis direction.

The upper part of the following Table 3 shows the radius of curvature R of each of optical surfaces (screen, mirror, stop, and image display device surfaces) and air space D between each pair of optical surfaces in the reflection type projection optical system in accordance with Example 3. The middle part of Table 3 shows the free-form surface coefficients (including the aspheric surface coefficients) in the above-mentioned free-form surface expression, whereas the lower part of Table 3 shows the amount of eccentricity of each mirror surface.

The value corresponding to conditional expression (1) in the optical system of Example 3 is −0.57, whereby this conditional expression is satisfied.

Figure 7E:
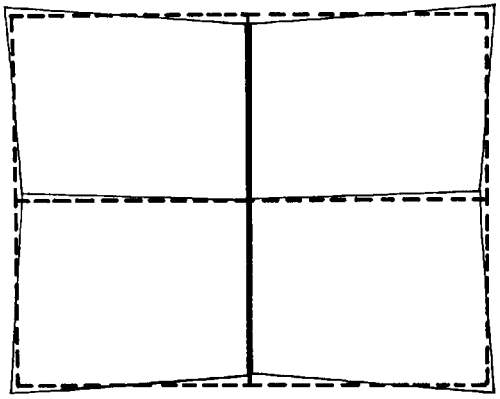
Figure 7C:
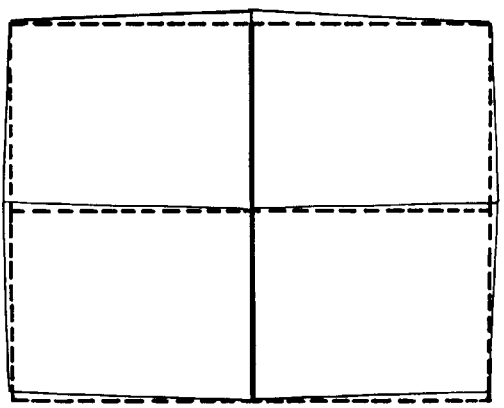

FIG. 7C shows the distortion concerning Example 3.

Figure 10:
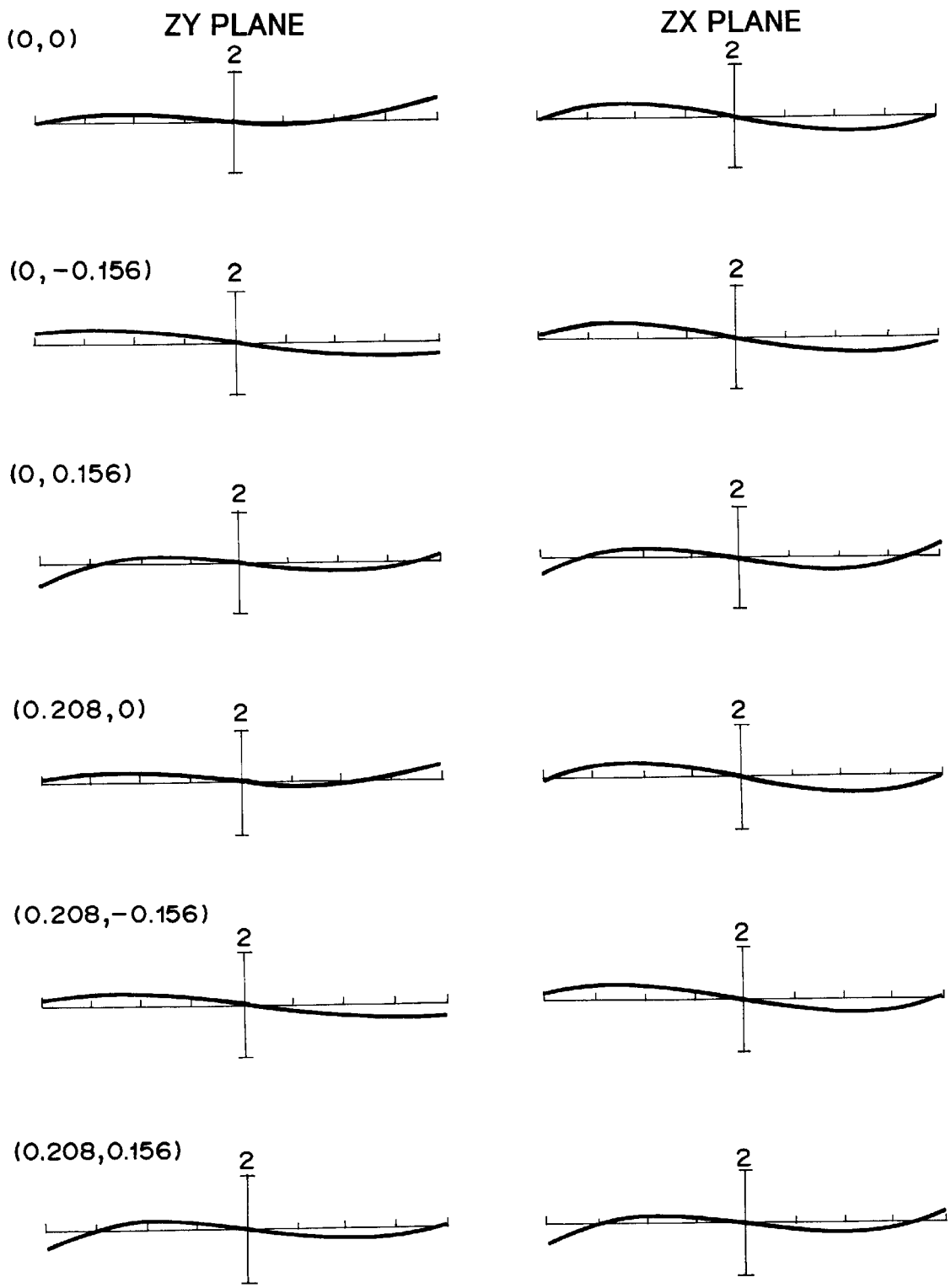
FIG. 10 is aberration chart showing lateral aberration of the reflection type projection optical system in accordance with Example 3 of the present invention.

FIG. 10 shows the lateral aberration concerning Example 3.

Each of these aberration charts clearly shows that the lateral aberration in the reflection type projection optical system in accordance with Example 3 is made favorable.

Example 4

Figure 4:
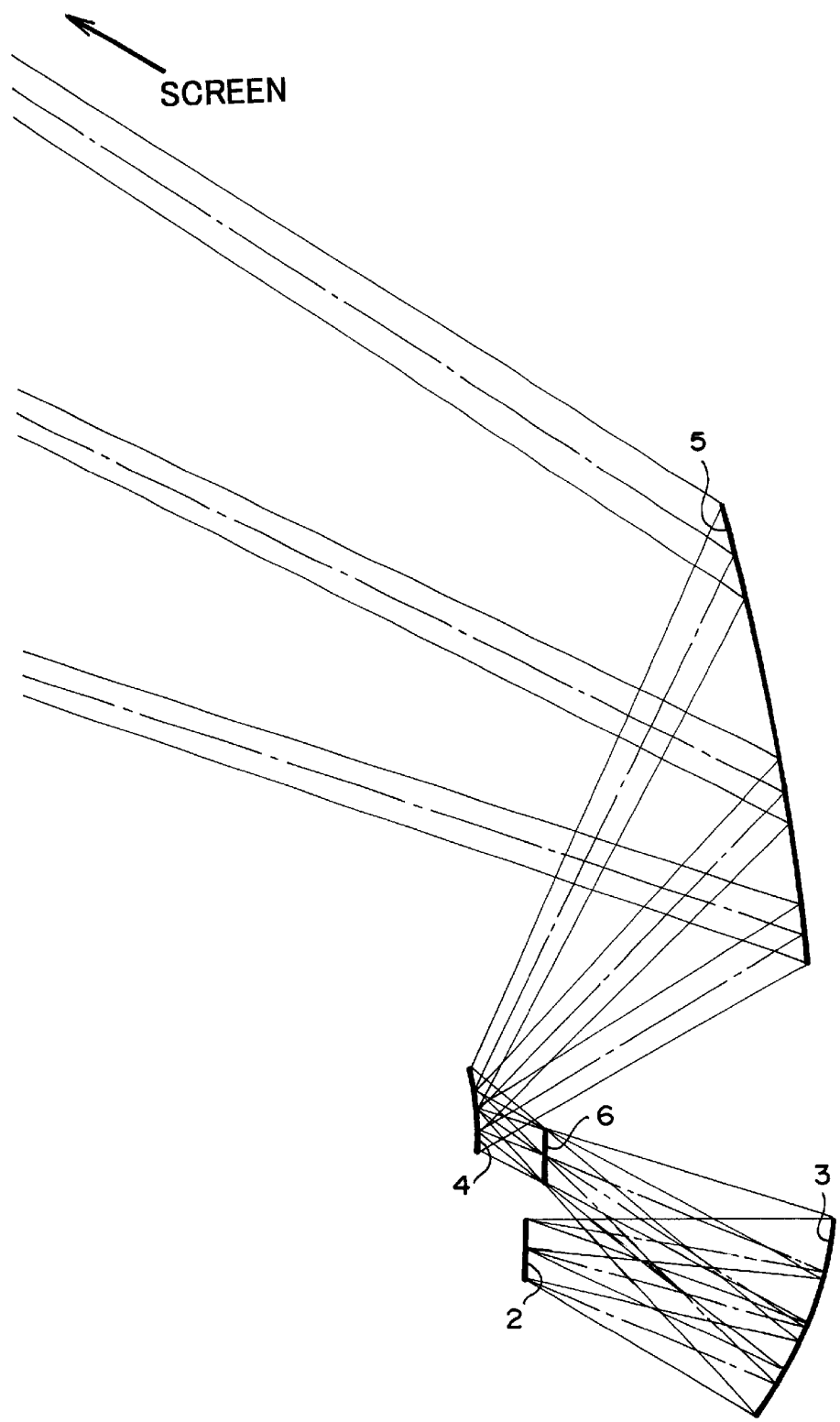
FIG. 4 is a sectional view showing the reflection type projection optical system in accordance with Example 4 of the present invention.

The reflection type projection optical system in accordance with Example 4 of the present invention will now be explained with reference to FIG. 4. In the optical system of Example 4, each of the mirror surfaces is a free-form surface (including an aspheric surface) represented by the above-mentioned free-form surface expression (including an aspheric surface expression), whereas the image display device surface has an amount of eccentricity with respect to the optical axis due to a deviation in Y-axis direction and a tilt of X axis (rotation of ZY plane about X axis).

The upper part of the following Table 4 shows the radius of curvature R of each of optical surfaces (screen, mirror, stop, and image display device surfaces) and air space D between each pair of optical surfaces in the reflection type projection optical system in accordance with Example 4. The middle part of Table 4 shows the free-form surface coefficients (including the aspheric surface coefficients) in the above-mentioned free-form surface expression, whereas the lower part of Table 4 shows the amount of eccentricity of the image display device surface.

The value corresponding to conditional expression (1) in the optical system of Example 4 is −0.63, whereby this conditional expression is satisfied.

FIG. 7D shows the distortion concerning Example 4.

Figure 11:
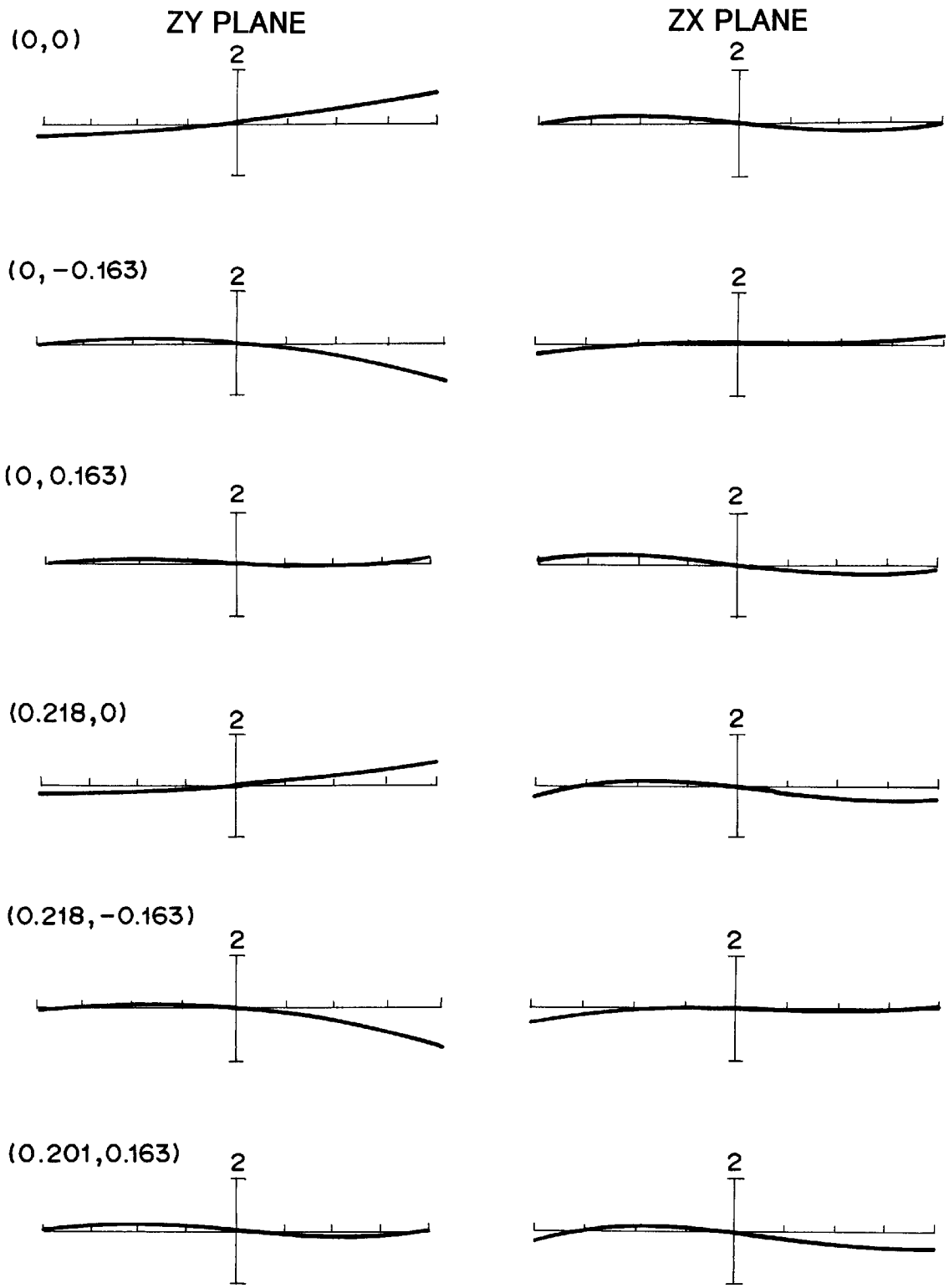
FIG. 11 is aberration chart showing lateral aberration of the reflection type projection optical system in accordance with Example 4 of the present invention.

FIG. 11 show the lateral aberration concerning Example 4.

Each of these aberration charts clearly shows that the lateral aberration in the reflection type projection optical system in accordance with Example 4 is made favorable.

Example 5

Figure 5:
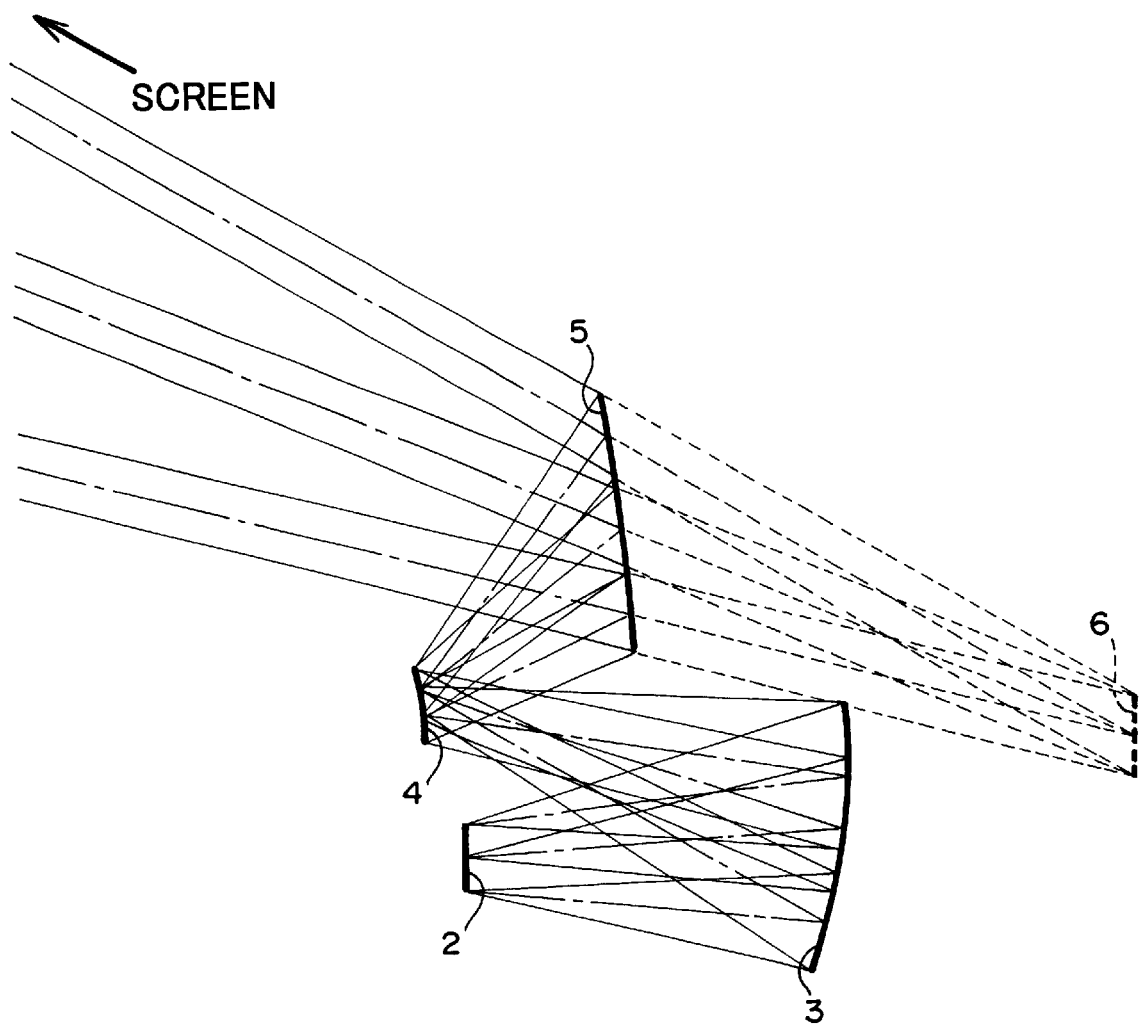
FIG. 5 is a sectional view showing the reflection type projection optical system in accordance with Example 5 of the present invention.

The reflection type projection optical system in accordance with Example 5 of the present invention will now be explained with reference to FIG. 5. In the optical system of Example 5, each of the mirror surfaces is a free-form surface (including an aspheric surface) represented by the above-mentioned free-form surface expression (including an aspheric surface expression) and has an amount of eccentricity with respect to the optical axis due to a deviation in Y-axis direction.

The upper part of the following Table 5 shows the radius of curvature R of each of optical surfaces (screen, mirror, stop, and image display device surfaces) and air space D between each pair of optical surfaces in the reflection type projection optical system in accordance with Example 5. The middle part of Table 5 shows the free-form surface coefficients (including the aspheric surface coefficients) in the above-mentioned free-form surface expression, whereas the lower part of Table 5 shows the amount of eccentricity of each mirror surface.

The value corresponding to conditional expression (1) in the optical system of Example 5 is −0.83, whereby this conditional expression is satisfied.

FIG. 7E shows the distortion concerning Example 5.

Figure 12:
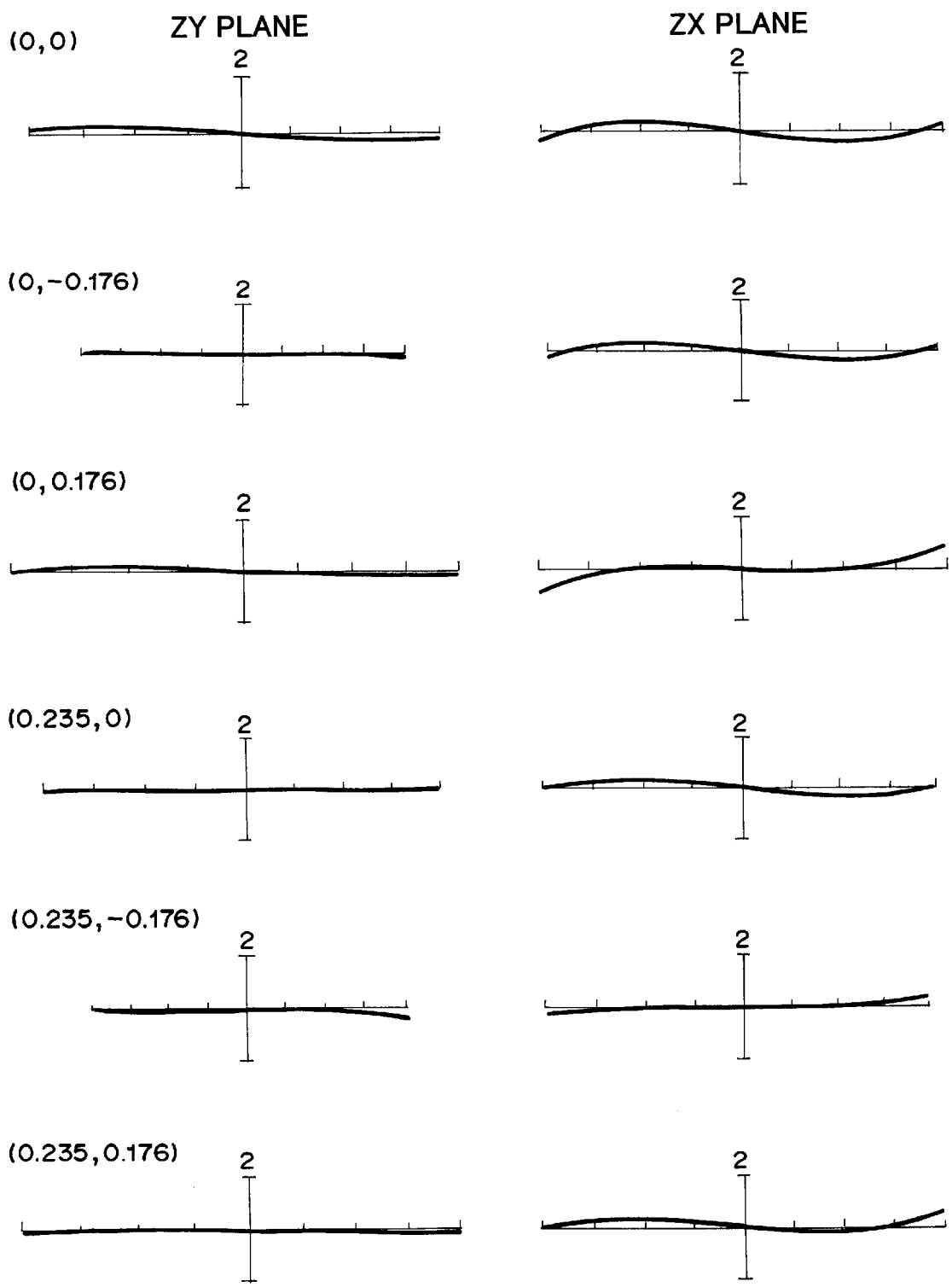
FIG. 12 is aberration chart showing lateral aberration of the reflection type projection optical system in accordance with Example 5 of the present invention.

FIG. 12 show the lateral aberration concerning Example 5.

Each of these aberration charts clearly shows that the lateral aberration in the reflection type projection optical system in accordance with Example 5 is made favorable.

The reflection type projection optical system in accordance with the present invention is usable not only in projectors using a light valve device made of a transmission or reflection type liquid crystal device, but also as a projection optical system mounted in a projector using other light valve devices such as digital micromirror device (DMD).

As explained in the foregoing, the reflection type projection optical system in accordance with the present invention comprises, successively from the enlargement side, a first mirror having a positive power, a second mirror having a negative power, and a third mirror having a positive power, so as to split a positive power into the front and rear sides of the optical system, thereby being able to yield a bright optical system while making each kind of aberration favorable.

TABLE 1

| Surface | R | D | |
|---|---|---|---|
| screen | ∞ | 21.77559 | |
| 1 | −249.993 | −2.278 | reflecting surface of mirror 5 |
| 2 | −3.6521 | 1.60762 | reflecting surface of mirror 4 |
| stop | ∞ | 1.89001 | |
| 4 | −3.7058 | −2.87198 | reflecting surface of mirror 3 |
| device surface | ∞ | | |

| Surface | K | $A_4$ | $A_6$ | $A_8$ |
|---|---|---|---|---|
| 1 | 1.00 | $-1.87 \times 10^{-3}$ | $9.5 \times 10^{-5}$ | $-2.49 \times 10^{-6}$ |
| 2 | 1.01 | $-2.90 \times 10^{-2}$ | $-3.94 \times 10^{-3}$ | $-3.11 \times 10^{-4}$ |
| 4 | $9.69 \times 10^{-1}$ | $-3.68 \times 10^{-4}$ | $-1.06 \times 10^{-4}$ | $7.78 \times 10^{-6}$ |

TABLE 1-continued

| | $C_{20}$ | $C_{02}$ | $C_{21}$ | $C_{03}$ |
|---|---|---|---|---|
| 1 | | | | |
| 2 | | | | |
| 4 | | | | |

| | $C_{40}$ | $C_{22}$ | $C_{04}$ |
|---|---|---|---|
| 1 | | | |
| 2 | | | |
| 4 | | | |

| Eccentricity Surface screen | Y-axis deviation |
|---|---|
| 1 | −0.032 |
| 2 | −0.032 |
| stop | |
| 4 | −0.032 |
| device surface | −0.409 |

TABLE 2

| Surface | R | D | |
|---|---|---|---|
| screen | ∞ | 21.41877 | |
| 1 | −249.9213 | −2.71991 | reflecting surface of mirror 5 |
| 2 | −3.4412 | 1.41102 | reflecting surface of mirror 4 |
| stop | ∞ | 1.69935 | |
| 4 | −3.4882 | −2.75414 | reflecting surface of mirror 3 |
| device surface | ∞ | | |

| Surface | K | $A_4$ | $A_6$ | $A_8$ |
|---|---|---|---|---|
| 1 | 1.00 | $-8.48 \times 10^{-4}$ | $2.90 \times 10^{-5}$ | $-4.10 \times 10^{-7}$ |
| 2 | 1.01 | $-3.02 \times 10^{-2}$ | $-4.61 \times 10^{-3}$ | $-3.20 \times 10^{-4}$ |
| 4 | $9.68 \times 10^{-1}$ | $-4.03 \times 10^{-4}$ | $-1.39 \times 10^{-4}$ | $1.62 \times 10^{-5}$ |

| | $C_{20}$ | $C_{02}$ | $C_{21}$ | $C_{03}$ |
|---|---|---|---|---|
| 1 | $-1.97 \times 10^{-3}$ | $-1.53 \times 10^{-3}$ | $-2.60 \times 10^{-4}$ | $-6.36 \times 10^{-4}$ |
| 2 | | | | |
| 4 | | | | |

| | $C_{40}$ | $C_{22}$ | $C_{04}$ |
|---|---|---|---|
| 1 | $-1.36 \times 10^{-4}$ | $-2.32 \times 10^{-4}$ | $-3.33 \times 10^{-5}$ |
| 2 | | | |
| 4 | | | |

| Eccentricity Surface screen | Y-axis is deviation |
|---|---|
| 1 | 0.619 |
| 2 | 0.619 |
| stop | |
| 4 | 0.619 |
| device surface | −1.0052 |

TABLE 3

| Surface | R | D | |
|---|---|---|---|
| screen | ∞ | 20.64065 | |
| 1 | −12.5763 | −2.08227 | reflecting surface of mirror 5 |
| 2 | −2.0398 | 0.63632 | reflecting surface of mirror 4 |

TABLE 3-continued

| | | | |
|---|---|---|---|
| stop | ∞ | 1.45681 | |
| 4 | −2.2832 | −1.74871 | reflecting surface of mirror 3 |
| device surface | ∞ | | |

| Surface | K | $A_4$ | $A_6$ | $A_8$ |
|---|---|---|---|---|
| 1 | $9.39 \times 10^{-1}$ | | | |
| 2 | 2.50 | | | |
| 4 | 1.12 | | | |

| | $C_{20}$ | $C_{02}$ | $C_{21}$ | $C_{03}$ |
|---|---|---|---|---|
| 1 | $-1.08 \times 10^{-3}$ | $-9.60 \times 10^{-4}$ | $-1.27 \times 10^{-3}$ | $2.81 \times 10^{-4}$ |
| 2 | $8.29 \times 10^{-3}$ | $3.34 \times 10^{-2}$ | $-6.59 \times 10^{-4}$ | $1.89 \times 10^{-2}$ |
| 4 | $1.86 \times 10^{-3}$ | $6.45 \times 10^{-3}$ | $-1.29 \times 10^{-4}$ | $-5.74 \times 10^{-4}$ |

| | $C_{40}$ | $C_{22}$ | $C_{04}$ |
|---|---|---|---|
| 1 | $-6.08 \times 10^{-5}$ | $2.39 \times 10^{-4}$ | $-1.54 \times 10-5$ |
| 2 | $-7.50 \times 10^{-3}$ | $9.08 \times 10^{-4}$ | $-8.53 \times 10^{-3}$ |
| 4 | $-1.00 \times 10^{-3}$ | $-1.55 \times 10^{-3}$ | $-7.28 \times 10^{-4}$ |

| Eccentricity Surface | Y-axis is deviation |
|---|---|
| screen | |
| 1 | 0.17 |
| 2 | −0.018 |
| stop | |
| 4 | −0.008 |
| device surface | −0.441 |

TABLE 4

| Surface | R | D | |
|---|---|---|---|
| screen | ∞ | 20.99172 | |
| 1 | −13.8619 | −2.03483 | reflecting surface of mirror 5 |
| 2 | −2.1215 | 0.3902 | reflecting surface of mirror 4 |
| stop | ∞ | 1.78165 | |
| 4 | −2.4176 | −1.89356 | reflecting surface of mirror 3 |
| device surface | ∞ | | |

| Surface | K | $A_4$ | $A_6$ | $A_8$ |
|---|---|---|---|---|
| 1 | 1.02 | | | |
| 2 | 2.62 | | | |
| 4 | 1.10 | | | |

| | $C_{20}$ | $C_{02}$ | $C_{21}$ | $C_{03}$ |
|---|---|---|---|---|
| 1 | $4.34 \times 10^{-3}$ | $-1.98 \times 10^{-3}$ | $-1.80 \times 10^{-3}$ | $1.59 \times 10^{-4}$ |
| 2 | $2.92 \times 10^{-2}$ | $3.18 \times 10^{-2}$ | $1.59 \times 10^{-2}$ | $2.24 \times 10^{-2}$ |
| 4 | $3.65 \times 10^{-3}$ | $6.51 \times 10^{-3}$ | $-1.65 \times 10^{-3}$ | $-9.41 \times 10^{-4}$ |

| | $C_{40}$ | $C_{22}$ | $C_{04}$ |
|---|---|---|---|
| 1 | $-1.81 \times 10^{-4}$ | $2.94 \times 10^{-4}$ | $-1.38 \times 10^{-5}$ |
| 2 | $-1.14 \times 10^{-2}$ | $1.60 \times 10^{-2}$ | $-5.42 \times 10^{-3}$ |
| 4 | $-4.35 \times 10^{-4}$ | $-9.10 \times 10^{-4}$ | $-5.40 \times 10^{-4}$ |

| Eccentricity Surface | Y-axis deviation | X-axis tilt |
|---|---|---|
| screen | | |
| 1 | | |
| 2 | | |
| stop | | |
| 4 | | |
| device surface | −0.527 | −1.92129 |

TABLE 5

| Surface | R | D | |
|---|---|---|---|
| screen | ∞ | 28.57477 | |
| stop | ∞ | −2.84158 | |
| 2 | −7.6764 | −1.2241 | reflecting surface of mirror 5 |
| 3 | −1.5531 | 2.40831 | reflecting surface of mirror 4 |
| 4 | −2.6797 | −2.18401 | reflecting surface of mirror 3 |
| device surface | ∞ | | |

| Surface | K | $A_4$ | $A_6$ | $A_8$ |
|---|---|---|---|---|
| 2 | 1.00 | | | |
| 3 | 1.18 | | | |
| 4 | $9.16 \times 10^{-1}$ | | | |

| | $C_{20}$ | $C_{02}$ | $C_{21}$ | $C_{03}$ |
|---|---|---|---|---|
| 2 | $2.26 \times 10^{-3}$ | $1.86 \times 10^{-2}$ | $-4.30 \times 10^{-6}$ | $7.09 \times 10^{-4}$ |
| 3 | $7.43 \times 10^{-2}$ | $1.33 \times 10^{-1}$ | $-9.03 \times 10^{-3}$ | $1.25 \times 10^{-2}$ |
| 4 | $6.59 \times 10^{-3}$ | $1.27 \times 10^{-2}$ | $4.27 \times 10^{-4}$ | $3.50 \times 10^{-4}$ |

| | $C_{40}$ | $C_{22}$ | $C_{04}$ |
|---|---|---|---|
| 2 | $4.95 \times 10^{-4}$ | $-1.58 \times 10^{-3}$ | $-1.28 \times 10^{-3}$ |
| 3 | $6.67 \times 10^{-3}$ | $-1.18 \times 10^{-2}$ | 0.00 |
| 4 | $-1.01 \times 10^{-3}$ | $-1.11 \times 10^{-3}$ | $-1.88 \times 10^{-4}$ |

| | $C_{60}$ | $C_{42}$ | $C_{24}$ | $C_{06}$ |
|---|---|---|---|---|
| 2 | $-5.41 \times 10^{-6}$ | $-4.74 \times 10^{-5}$ | $2.21 \times 10^{-4}$ | $7.00 \times 10^{-5}$ |
| 3 | $-1.43 \times 10^{-6}$ | $-2.29 \times 10^{-6}$ | $-3.46 \times 10^{-6}$ | $-1.68 \times 10^{-5}$ |
| 4 | $-5.07 \times 10^{-5}$ | $-5.19 \times 10^{-4}$ | $-3.08 \times 10^{-4}$ | $-2.60 \times 10^{-5}$ |

| Eccentricity Surface | Y-axis deviation |
|---|---|
| screen | |
| stop | |
| 2 | −0.105 |
| 3 | −0.105 |
| 4 | −0.105 |
| device surface | −0.587 |

What is claimed is:

1. A reflection type projection optical system for projecting onto a screen under magnification a luminous flux carrying image information from a light valve driven by an image signal; said reflection type projection optical system comprising successively from an enlargement side:

a first mirror having a positive power;

a second mirror having a negative power;

a third mirror having a positive power; and wherein said reflection type projection optical system satisfies the following conditional expression (1):

$$-1.0 < f_3/f_{12} < -0.2 \quad (1)$$

where $f_{12}$ is the composite focal length of said first and second mirrors, and $f_3$ is the focal length of said third mirror.

2. A reflection type projection optical system according to claim 1, wherein at least one of said three mirrors is constituted by a free-form surface having a form rotationally asymmetrical about an optical axis thereof.

3. A reflection type projection optical system according to claim 2, wherein said first mirror is constituted by a free-form surface having a form rotationally asymmetrical about said optical axis.

4. A reflection type projection optical system according to claim 2, wherein said each of said three mirrors is constituted by a free-form surface having a form rotationally asymmetrical about said optical axis.

5. A reflection type projection optical system according to claim 1, wherein all of said three mirrors have respective optical axes within a single plane.

6. A reflection type projection optical system according to claim 5, wherein said three mirrors have the same optical axis.

7. A reflection type projection optical system according to claim 1, wherein said light valve is one selected from a transmission type liquid crystal device, a reflection type liquid crystal device, and a digital micromirror device.

* * * * *